Aug. 11, 1964     B. H. KASS     3,144,228
VIBRATION ISOLATOR

Filed June 8, 1961     2 Sheets-Sheet 1

INVENTOR.
Bernard H. Kass
BY
ATTORNEY

Aug. 11, 1964  B. H. KASS  3,144,228
VIBRATION ISOLATOR
Filed June 8, 1961  2 Sheets-Sheet 2
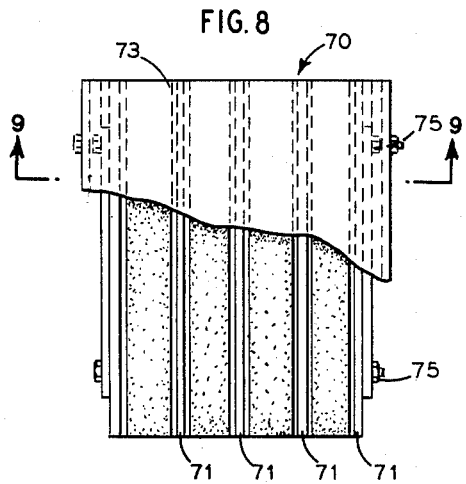
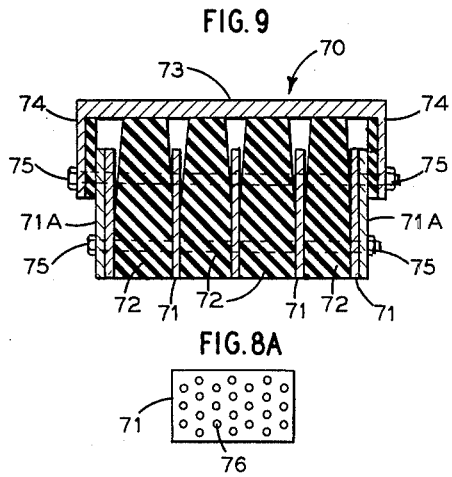
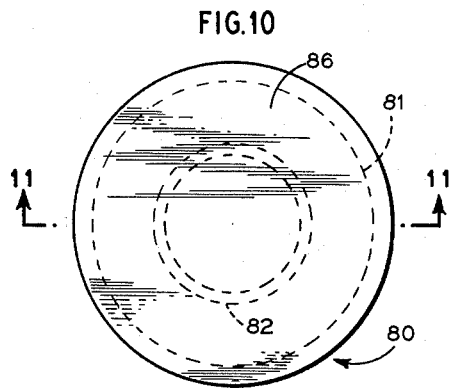
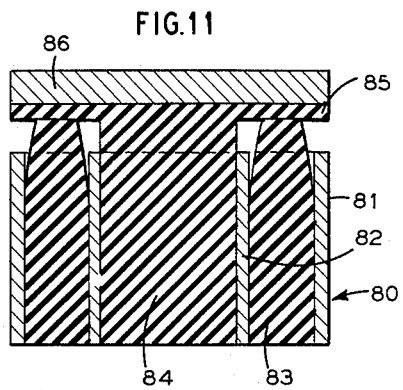
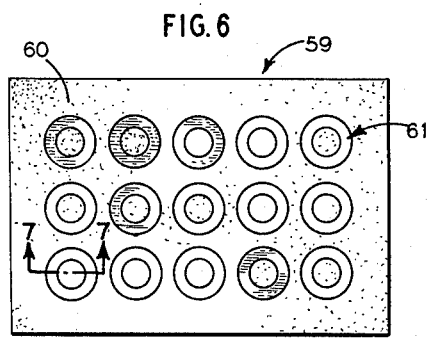
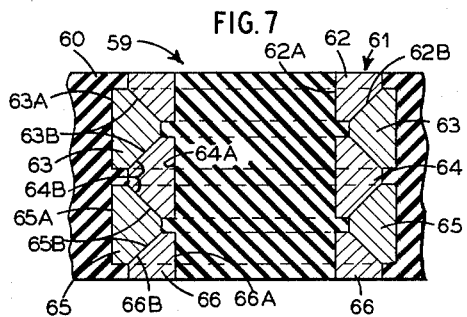
INVENTOR.
Bernard H. Kass
BY
Irving Seidman
ATTORNEY United States Patent Office 3,144,228
Patented Aug. 11, 1964

3,144,228
VIBRATION ISOLATOR
Bernard H. Kass, 49 Cloister Lane, Hicksville,
Long Island, N.Y.
Filed June 8, 1961, Ser. No. 115,626
4 Claims. (Cl. 248—21)

This invention relates in general to a vibration isolator, and more specifically, to an isolation and dampening device to prevent shock, vibration and/or noise transmission to a load imposed thereon, to the supporting sub-base or as a resilient joint interposed between structural elements for purposes of accommodating thermal or other displacements without inducing severe stresses in said members.

Heretofore, vibration isolators applicable to a machine, foundation or structural mounting and the like were generally made of a plastic-like material, e.g. natural on synthetic rubbers, plastics, fibreglass, asbestos and the like laminated with layers of woven fabric for added strength. However, the added strength attributed to the added layers of laminated fabrics was had at the sacrifice of resiliency and economy. In some known instances lead has also been employed in such applications. However, it has been noted that each of the above named materials when employed as described possessed many undesirable characteristics which limit their use and application.

For example, these resilient materials have a considerable permanent set when subjected to a heavy loading. Further, such materials when under compression will flow so that the material area perpendicular to the direction of loading is increased substantially. Under considerable compressive loadings such materials have been known to yield or extrude until the thickness, i.e. the dimension parallel to the direction of loading, approached zero. When this occurred probable damage to the machine, foundation, or structure supported thereon resulted.

To sustain considerable compressive loads isolators made of these resilient materials required "shape factors" having a large area to thickness ratio. This resulted in isolators having an infinite shearing stiffness in the horizontal plane so that little or no isolation is provided for shock and vibration in that direction. Further, materials such as lead, asbestos and the like possessed little, if any, elastic memory and could absorb shock and vibration only through permanent deformations.

A further disadvantage inherent in isolators made solely of resilient materials with a flow characteristic is that their load capacity and stiffness is considerably reduced as temperatures increase. The laminated, higher strength materials required substantial thickness, at great cost, in order to provide suitable isolation, while other materials required large compressive areas to accommodate structural loads that complicated their installation with costly load distributing devices.

An object of this invention is to utilize a resilient plastic-like material having a flowable characteristic as one load bearing member supplemented by another elastic load bearing element having a higher yield point which is arranged in a manner so that the "flow" of the resilient material under load is confined within contained volumes defined by the supplemental elastic load bearing element.

Another object is to provide an isolator construction that is most resilient at its high rated load and which increases in stiffness under greater loads.

Another object is to provide an isolator construction employing a resilient plastic-like load bearing member having a flowable characteristic which will not result in unlimited flow or extrusion of the resilient material under heavy loadings.

A feature of this invention resides in the provision that the isolators embodying the present invention are relatively simple in structure and positive in operation.

Another feature of the isolators of this invention resides in the provision that unusual overloads will not produce unlimited "flow" or extrusion of the resilient plastic-like member of the isolator.

Other features and advantages will be readily apparent when considered in view of the drawings and description thereof in which:

FIG. 6 illustrates the plan view of another modified form of the invention.

FIG. 7 is a section view taken along line 7—7 of FIG. 6.

FIG. 8 is a plan view of still another modified embodiment of the invention.

FIG. 8A is a detail view of the separator plate of FIG. 8.

FIG. 9 is a section view taken along line 9—9 of FIG. 8.

FIG. 10 is a plan view of still another embodiment of the invention.

FIG. 11 is a section view taken along line 11—11 of FIG. 10.

The isolators embodying the invention, and to be herein described have general application and may be interposed, for example, between machinery and the supporting members, floor or sub-base thereof, machine foundations and their sub-base, building columns and their footings or pile caps, building floor beams and columns, highway or bridge girders or beams and their supporting piers or columns, or railroad tracks or ties and their supports. Also other applications would include use as dock bumpers, truck loading platform protectors, elevator safety cushions, building columns protection in basement garages, component isolators within a machine, and any other general uses wherein it is desirable to protect or minimize shock and vibration between complementary structures or machine components, and the like.

Figure 1:
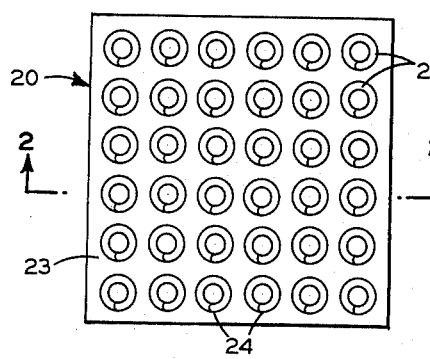
FIG. 1 illustrates a plan section view of an isolator embodying the instant invention taken along line 1—1 of FIG. 2.
Figure 2:
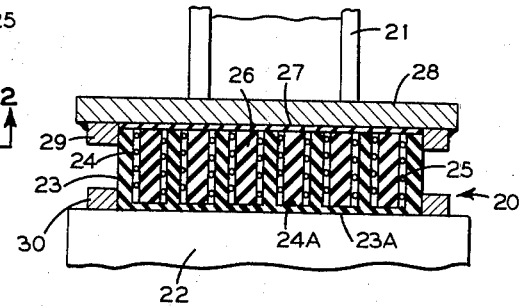
FIG. 2 is a vertical section view taken along line 2—2 of FIG. 1, illustrating the isolator applied as an isolation pad for a building column.

Referring to FIGS. 1 and 2, there is illustrated an isolation pad 20 adapted for use between a building column 21 and its column footing 22. As shown the isolator pad 20 comprises essentially a block member 23 formed of a resilient, plastic-like material, such as rubber, neoprene, foams, plastic (polyethylene, and the like) lead and the like. Also the block may be formed of woven metal strands, fibreglass, asbestos, and/or laminations thereof with layers of woven fabrics or sheet steel. According to this invention the block member 23, e.g. a block of neoprene, is formed with a plurality of pockets or wells 24 that are disposed in a predetermined geometric pattern. In the illustrated embodiment the pockets 24 are arranged in rows. While the pockets 24 may extend through the entire block, in the illustrated embodiment, the pockets 24 terminate just short of the bottom 23A of the pad, thus providing each pocket 24 with a bottom wall 24A. Fitted into each pocket 24 is a coil or helical spring 25 having spaced convolutions.

The spring 25 is sized so that the outside diameter of its convolutions are contiguous to the wall of its respective pocket. Fitted into the hollow of each spring 25 is a cylindrical core 26, preferably formed of the same material as that of the block 23. It will be noted that the diameter of the core 26 is such that its outer surface is contiguous with the inside edge of the spaced convolutions of the spring 25. If desired a sheet of resilient material 27 may be disposed over the block which will form a cover for the pockets 24 and the spring 25 disposed therein.

Resting on the cover sheet 27 is a load distributing plate 28 for distributing the weight of the load, e.g. a building column 21, to the isolation pad.

Welded or otherwise secured to the under surface of the distributor plate 28 is a frame member 29 which circumscribes the upper periphery of the block 23. A similar frame member 30 is disposed about the base of the block 23, the frame members 29 and 30 serving to position the isolation pads 20 between the column 21 and its footing 22. It will be understood that the distributor plate 28 can be formed either as part of the column 21 or as a component of the isolation pad 20.

In this form of the invention the springs 25 together with the resilient neoprene block 23 directly support the imposed load. It will be noted that the construction described possesses a low horizontal stiffness and can therefore isolate shock and vibration in a horizontal direction as well as in a vertical direction; and also that no permanent set is encountered. This results from the non-continuous neoprene cross-section and from the low spring stiffness in the horizontal directions. Also with the construction described the spring 25 stability against buckling, due to a possible large ratio of height to diameter, is insured by the neoprene pressure on the spring coils.

A feature of the inventive construction is that the neoprene will tend to flow between the spring coils 25 under load. This prevents complete closure of the spring and a direct metal to metal contact between the coil convolutions. Designs for other applications can permit the spring coils to close completely, if a rigid "stop" is desired. Also the arrangement is such that flow of resilient material is restrained by the spring elements, and the resilient member in turn prevents buckling or instability of the spring elements 25. Thus the resilient block of material can be subjected to compressive loading which far exceeds the yield capacity of the basic material without resulting in unlimited flow thereof.

Figure 5:
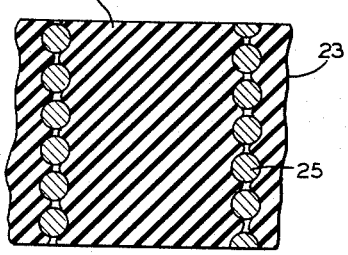
FIG. 5 is an enlarged detail section view illustrating the flow of resilient material when under load and the enlarged area of contact between the springs and the resilient members.

As seen in FIG. 5, the interaction of the resilient material which make up the block 23 and the core 26, and the spring 25, is such that under load the material of the block and core will flow between the convolutions of the spring 25 and thus provide a relatively large area of direct contact therebetween which results in greatly enhancing the dampening qualities of this construction.

It is to be further noted that the environmental temperature effects on the load capacities of the isolator are minimized since the load supporting springs 25 are not effected thereby, and further the springs 25 are protected from any corrosive or oxidizing effects of atmosphere.

Figure 3:
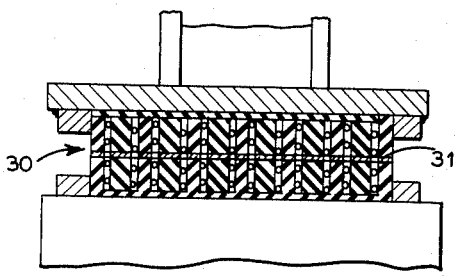
FIG. 3 is a vertical sectional view illustrating a slightly modified form of the invention of FIG. 2.

A modification of the invention as above described is shown in FIG. 3. This form is identical in structure, function and operation as the isolator 20 of FIGS. 1 and 2, with the exception that the isolator 30 includes an intermediate thin steel plate 31 that extends parallel to the top and bottom surfaces of the isolator 30. One or more of such steel plates may be utilized depending on the thickness of the pad 32.

Figure 4:
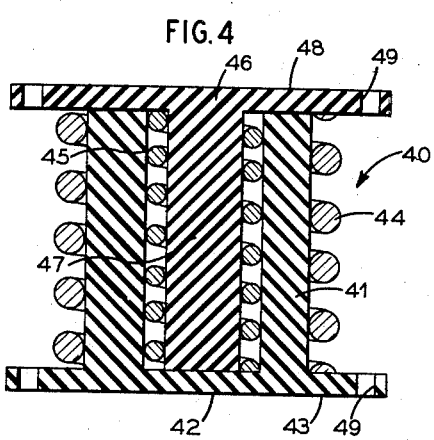
FIG. 4 illustrates a vertical sectional view taken through another modified embodiment of the invention.

FIG. 4 illustrates a single unit mounting means 40 which is particularly suitable for direct interposition between a machine base and the floor. This form comprises a tubular or cylindrical resilient member 41 having an integral formed base portion 42 defining a laterally extending base flange 43 which is adapted to rest on the floor or other support. A coil spring 44 having spaced convolutions circumscribes the outer surface of the cylinder portion 41 so that its convolutions are contiguous thereto. An inner coil spring 45 is fitted into the tubular portion 41 so that its convolutions are in engagement with the inner surface of the tubular portion 41. Completing the assembly is a second resilient member 46 forming a core portion 47 which is adapted to occupy the volume of the inner spring. Integrally formed with core 47 is an upper flange 48 which corresponds with the lower flange 43. If desired the lower and upper flanges 43 and 48 may be provided with bolt openings 49. Thus it will be noted that the convolutions of the inner spring 45 are sandwiched between the core 47 and the cylinder 41. The principle of operation of this form of the invention is similar as hereinabove described.

FIGS. 6 and 7 illustrate another modified embodiment. In this form the isolator 59 includes a resilient block member 60 having one or more spring means 61 imbedded therein. As shown in FIG. 7, the spring means consists of a plurality of superposed rings 62, 63, 64, 65 and 66. Alternate rings 62, 64 and 66 are each provided with a cylindrical inner wall surface 62A, 64A and 66A respectively, and an outer inclined surface 62B, 64B and 66B, which slope outwardly toward the outer circumference of the ring. The rings 63 and 65 disposed between alternate rings 62, 63 and 66 are formed with outer cylindrical surfaces 63A, 65A, respectively, and inwardly sloping inclined surfaces 63B and 65B respectively. As shown the rings 62–66 are stacked so that the inclined surfaces of adjacent rings are in contact with one another. The ararngement is such that when a compressive load is placed upon the block 60, the wedging action imparted to the respective rings subject rings 62, 64 and 65 to compressive forces, i.e. the wedging action therein tends to compress the rings, whereas rings 63 and 65 are subjected to tensile stresses, i.e. the wedging action tends to expand or increase the circumference thereof. Meanwhile the ring spring members 62–66 serve to confine the flow of the resilient material in which the spring rings are imbedded.

FIGS. 8 and 9 illustrate a further embodiment. In this form the isolator 70 comprises a plurality of spaced parallel separator plate members 71 which sandwich therebetween blocks of resilient material 72, such as neoprene or the like. As shown in FIG. 9 the resilient blocks have a height or thickness greater than that of the members 71 so that the upper portion of the resilient blocks extends above the plates 71. It will be noted that the extended or upper portions of blocks 72 are provided with an inward taper. Leaf springs 71A are placed adjacent the end plates 71.

Resting on top of the blocks 72 is a distributing plate 73 which has depending flange portions 74 which are arranged to overhang the end spring leaves 71A. Securing the respective blocks, intermediate plates 71 and spring leaves 71A together are tie bolts 75 which extend through aligned apertures formed in the individual parts thereof. The upper tie bolts further extend through the flanges 74 of the distributor plate 73.

If desired the separator plates 71 disposed between blocks 72 may be perforated as shown in FIG. 8A. In this form of the invention the leaf springs 71 indirectly support the imposed loading, and further they serve to contain the flow of neoprene. The separators 71, may have holes 76 which provide additional volume for internal voids for the flow of neoprene under pressure.

The embodiment of FIGS. 10 and 11 illustrate another form 80 of the invention. In this form, a pair of concentrically spaced elastic rings 81, 82 of steel or the like contains therebetween a ring of resilient material 83 such as neoprene. In this form the upper end of the resilient ring 83 extends beyond the upper ends of rings 81, 82. Also the extended ends of the resilient material taper inwardly. It will be noted that the tapered upper ends provide a void for the flow of resilient members under load. A core 84 of similar resilient material occupies the volume defined by the inner ring 82. Integrally formed at the upper end of core 84 is a laterally extending flange 85 arranged to overlie the upper end of the resilient ring 83, and on top of flange 85 rests a distributor plate 86. Thus in this form, as in the embodiments of FIGS. 8 and 9, the elastic steel rings 81, 82 indirectly support the imposed loading.

From the foregoing description it will be noted that each isolator embodiment comprises a block of resilient material having a flowable characteristic supplemented by elastic spring means preferably made of metal for containing the flow of the resilient material under heavy or overload conditions. The arrangements thereof are such that both the resilient members and elastic spring means cooperate to directly support the load, or the spring means may be arranged for indirectly supporting the load. In either event the resilient or plastic-like portion of the isolator can be subjected to loads which far exceed its yield capacity (as used in other forms) without resulting in a permanent set of the isolator since the spring means which have, for all practical purposes, an infinite yield point function to confine the flow of resilient material and to maintain the shape of the isolator.

While the instant invention has been disclosed with reference to particular embodiments for practicing the same, it is to be appreciated that the invention is not to be taken as limited to all of the details thereof as modifications and variations thereof may be made without departing from the spirit or scope of the invention.

What is claimed is:

1. A vibration isolator comprising a pair of spaced flat spring means, and a block of resilient plastic-like material having a flowable characteristic when subjected to high compressive loads, said block being sandwiched between said spring means so as to permit relative movement therebetween, said block having a portion thereof extending beyond said spring means, a load distributing plate positioned on the upper end of said block whereby a load transmitted to said plate is distributed parallel to the plane of said flat spring means, said plate having depending flanges overlying said spring means, and a fastening means extended transversely of the flanges of said distributor plate, said spring means, and resilient block disposed therebetween for securing the same together.

2. The invention as defined in claim 1 and including a plurality of spaced separator plates and a resilient plastic-like block of material sandwiched between each pair of adjacent spaced plates.

3. The invention as defined in claim 1 in which the upper portion of the resilient block tapers inwardly.

4. A device for isolating and dampening shock, vibration and/or noise transmission to a load imposed thereon comprising a pair of concentric cylindrical members, a cylindrical member formed of a resilient plastic-like material filling the annular space between said cylindrical members, said resilient cylindrical member having a tapering upper end portion defined as a surface of revolution extending beyond said cylindrical members, and a core of resilient plastic-like material occupying the volume defined by the inner cylindrical member, said core having an integrally formed flange in engagement with the upper end of said cylindrical resilient member; and a distributing plate overlying said flange.

References Cited in the file of this patent
UNITED STATES PATENTS

| | | |
|---|---|---|
| 1,917,929 | Duffy | July 11, 1933 |
| 1,936,389 | Hallquist | Nov. 21, 1933 |
| 2,129,124 | Geyer | Sept. 6, 1938 |
| 2,189,708 | Coyne | Feb. 6, 1940 |
| 2,270,902 | Rubissou | Jan. 27, 1942 |
| 2,365,842 | Rosenzweig | Dec. 26, 1944 |
| 2,678,797 | Ray | May 18, 1954 |
| 2,766,163 | Schwartz | Oct. 9, 1956 |
| 2,939,720 | Wroby | June 7, 1960 |